(12) United States Patent
Wen (10) Patent No.: US 6,286,761 B1
(45) Date of Patent: Sep. 11, 2001

(54) IDENTIFICATION DOCUMENT HAVING EMBEDDING INFORMATION RELATED TO THE SUBJECT

(75) Inventor: Xin Wen, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/454,098

(22) Filed: Dec. 3, 1999

(51) Int. Cl.[7] .................................................... G06K 7/10
(52) U.S. Cl. ............................................ 235/468; 235/487
(58) Field of Search .................................... 235/468, 487

(56) References Cited

U.S. PATENT DOCUMENTS

| | | | |
|---|---|---|---|
| 4,476,468 | * 10/1984 | Goldman | 235/468 |
| 4,663,518 | * 5/1987 | Borror et al. | 235/468 |
| 5,249,039 | 9/1993 | Chaplin . | |
| 5,502,304 | * 3/1996 | Berson et al. | 235/468 |
| 5,514,860 | * 5/1996 | Berson | 235/468 |

* cited by examiner

*Primary Examiner*—Harold I. Pitts
(74) *Attorney, Agent, or Firm*—Raymond L. Owens (57) ABSTRACT

An identification document for a subject includes a substrate and a visual image formed on the substrate or a recording layer over the substrate, such visual image including an identifiable first area. The identification document further includes invisible but retrievable embedded information formed in the identifiable first area but not formed in a second area of the visual image, such embedded information related to the subject or the use of the identification document.

2 Claims, 7 Drawing Sheets

IDENTIFICATION DOCUMENT HAVING EMBEDDING INFORMATION RELATED TO THE SUBJECT

CROSS REFERENCE TO RELATED APPLICATIONS

Reference is made to commonly-assigned U.S. patent application Ser. No. 09/218,614 filed Dec. 22, 1998, entitled "Method And Apparatus For Transaction Card Security Utilizing Embedded Image Data", by Ray et al; U.S. patent application Ser. No. 09/450,590 filed Sep. 27, 1999, entitled "Embedding Information in a Printed Image", by Wen et al; U.S. patent application Ser. No. 09/454,102 filed concurrently herewith entitled "Making Identification Document Having Embedded Information" by Xin Wen, and U.S. patent application Ser. No. 09/454,101 filed concurrently herewith, entitled "Method of Verifying the Authenticity of An Identification Document", by Xin Wen, the disclosures of which are incorporated herein by reference.

FIELD OF THE INVENTION

The present invention relates to identification document having embedded information which prevents counterfeiting of identification document.

BACKGROUND OF THE INVENTION

One important requirement for an identification document is that it needs to provide adequate measures for preventing counterfeiting, tampering, or forging of the identification document. An identification document can be an ID card, a membership card, or a credit or bank card, etc. The face image of the holder is often included on the identification document, which has been a rather effective feature for preventing the unauthorized use of the identification document.

However, as digital imaging technologies become increasingly advanced and widely available, counterfeiting is also becoming more sophisticated and more difficult to prevent. One example of the digitally assisted counterfeiting is that after the theft of an identification document, a counterfeiter can digitally scan the image on a identification document with a high-resolution digital scanner (such as a 1200 dpi flat bed scanner that is widely available). The scanned-in digital image is then processed on a computer using a commercial image processing software such as Adobe Photoshop or Corel's CorelDraw for sharpening, artifact removal, color and tone management. With the image processing software, the counterfeiter can easily replace the face of the intended holder by a different person while almost seamlessly matching the background of the face, to produce a fraudulent image. This fraudulent image is then printed on a blank substrate such as a plastic card to produce a counterfeit identification document. The digital imaging technologies have currently advanced to such a stage that this fraud identification document can appear almost identical to the original document to the naked eyes.

SUMMARY OF THE INVENTION

An object of the present invention is to provide an identification document having effective security features that minimize the counterfeiting of the identification document.

This object is achieved by an identification document for a subject, comprising:

a) a substrate;

b) a visual image formed on the substrate or a recording layer over the substrate, such visual image including an identifiable first area; and c) invisible but retrievable embedded information formed in the identifiable first area but not formed in a second area of the visual image, such embedded information related to the subject or the use of the identification document.

An advantage of the present invention is the effective prevention of the counterfeiting of identification document. Any alteration in the critical areas of the identification document can be detected by the verification system for a denial of the counterfeit identification document. Another advantage of the present invention is that the probability of false verification is greatly reduced.

A feature of the present invention is that the information related to the subject's identification can be embedded in a particular area of the visual image on the identification document such as the face area that is also used for identifying the subject. Any alteration or tampering of the critical area would destroy the embedded information and thus result in the invalidation of the identification document under proper detection by the verification system.

Another feature of the present invention is that the information related to the subject of the identification document is embedded in the visual image. The embedded information is only extracted from the particular areas such as the face area that is used for identifying the subject. Any alteration of the particular areas would destroy the embedded information and thus result in an invalidation of the identification document under proper detection by the verification system.

DETAILED DESCRIPTION OF THE INVENTION

Figure 1:
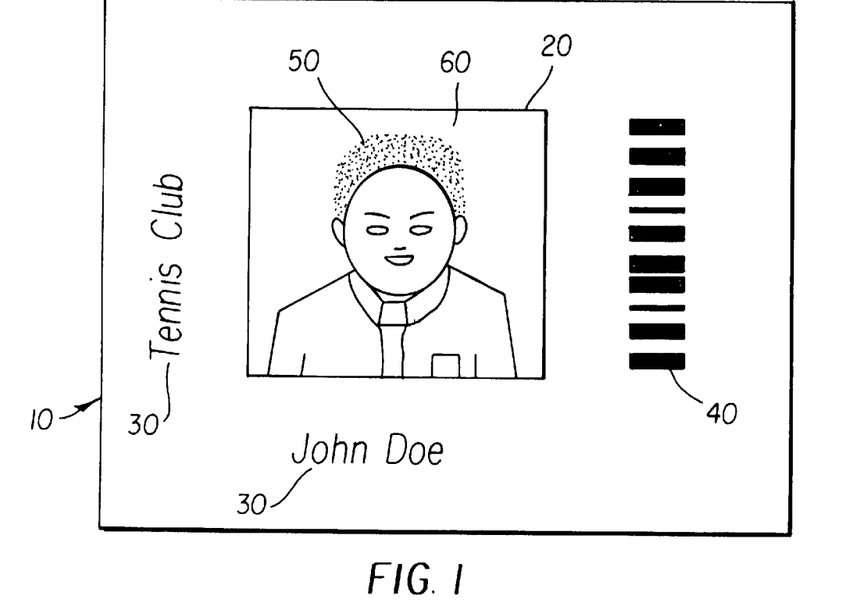
FIG. 1 illustrates a layout of an exemplified identification document in accordance with the present invention.

This invention relates to an identification document having embedded information for preventing counterfeiting. In this disclosure, the term identification document can include an ID card, a credit or bank card, phone card, cash card, membership card, a visa, a sheet in a passport having the passport holder's image, and other documents for identifying a subject of the identification document. The subject of the identification document is typically a person. FIG. 1 illustrates a layout of an exemplified identification document in accordance with the present invention. The identification document 10 includes a visual image 20, visual textual information 30 such as the name of the subject or purpose of the identification document 10, and machine readable information 40 such as a barcode. The visual image 20 can include a face image 50 of the subject of the identification document 10, and a background image 60. The face image 50 is in an identifiable first area. The background image 60 is in a second area of the visual image 20. The background image 60 can be adjacent to or surrounding to the face image 50. The face image 50 can be used for identifying the subject of the identification document 10.

Figure 2A:
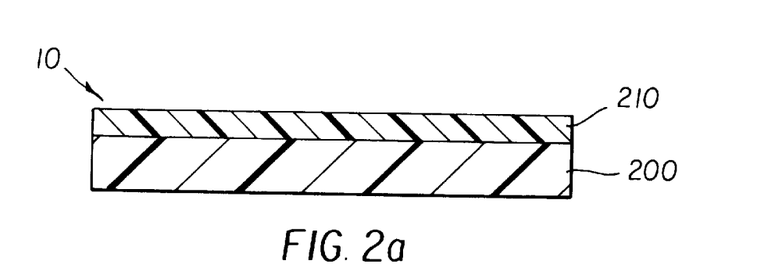
FIGS. 2a and 2b show the cross-sections of different identification documents shown in FIG. 1.
Figure 2B:
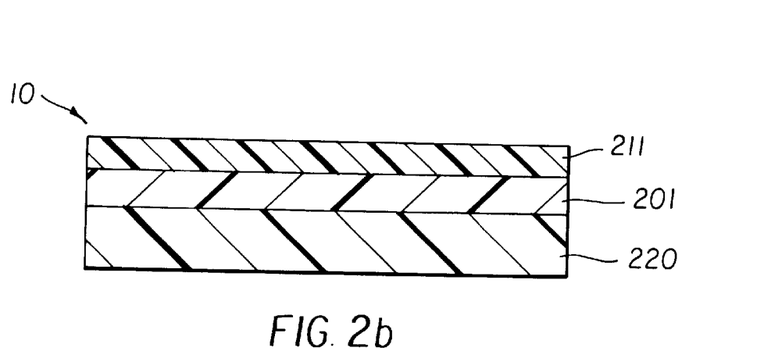

As shown in FIG. 2a and FIG. 2b, the image information of the identification document 10 is produced on an image receiving layer 200 or 201. A printer 460 (see FIG. 4) transfers colorants to the image receiving layer 200 or 201 to form the visual image 20, the visual textual information 30, and the machine readable information 40 as shown in FIG. 1. After the image is formed, a protection layer 210 or 211 such as a transparent plastic sheet is formed over the image receiving layer 200 or 201 for protecting the image and reducing the risk of image tampering. The protection layers 210 and 211 can be laminated over the colorant image. The identification document 10 can also include a substrate 220 supporting the image receiving layer 201. The image receiving layer 200 and the substrate 220 can comprise plastic material (e.g. in the case of an ID card, bank card or credit card), synthetic or natural paper (e.g. visa, passport, etc.), etc.

Figure 3:
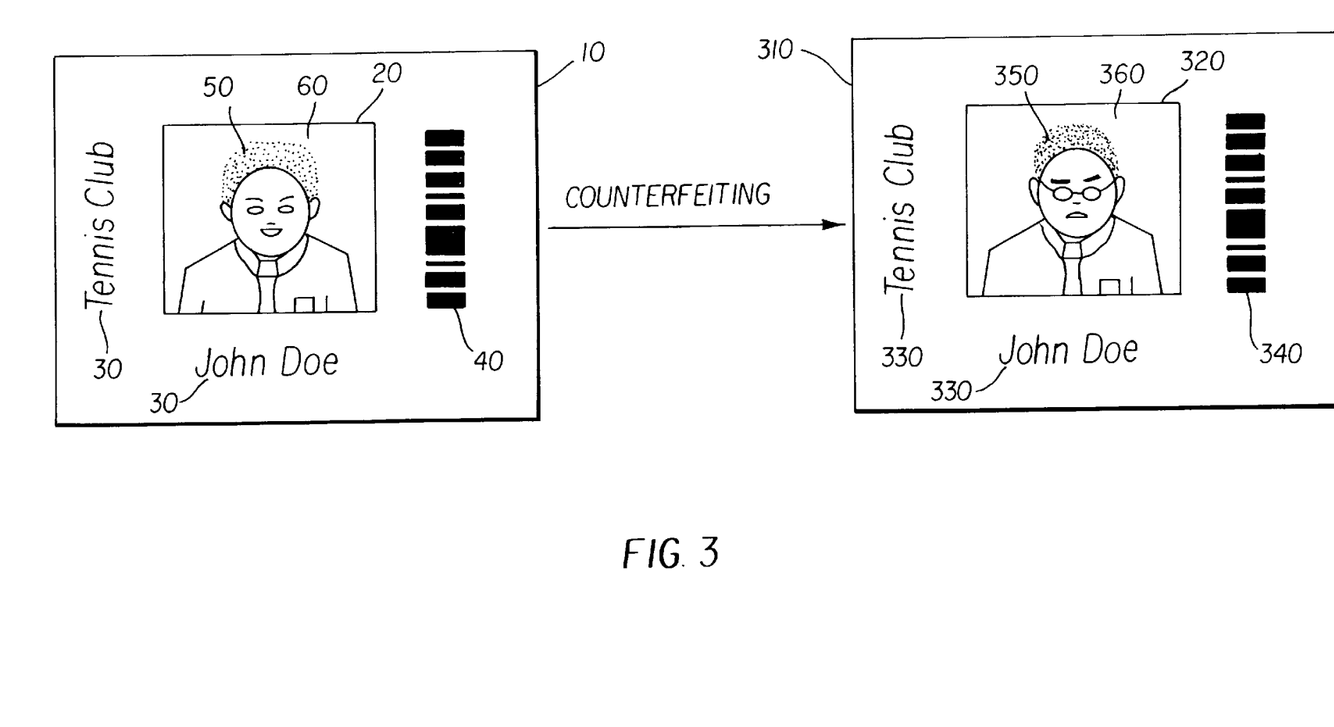
FIG. 3 illustrates a counterfeiting technique wherein the face of the intended subject of an identification documents is replaced by a different face of false identity.

FIG. 3 illustrates a counterfeiting technique described in the background. The original identification document 10 is scanned by a scanner, producing a scanned digital image. The scanned digital image is then stored on a computer and processed by a commercial image software such as Adobe Photoshop or Corel's CorelDraw. The face image 50 in the scanned digital image is replaced by a counterfeit face image 350 of a false identity. The digital image having the counterfeit face image 350 is then printed to produce a counterfeit identification document 310 that includes a counterfeit visual image 320 having the counterfeit face image 350 and a background image 360, visual textual information 330, and machine readable information 340. The person of the false identity can now hold the counterfeit identification document 310 to attempt to pass security check points for verifying the identification document 10. Since the counterfeit face image 350 matches the holder's face, the security check could mistakenly verify the counterfeit identification document 310. In the present invention, the term holder refers to the person that holds an identification document 10 or the counterfeit identification document 310. The authenticity of the identity of the holder or the identification document 10 has not been properly determined. In contrast, a subject of an identification document 10 refers to the correct or the intended holder of the identification document 10.

Figure 4:
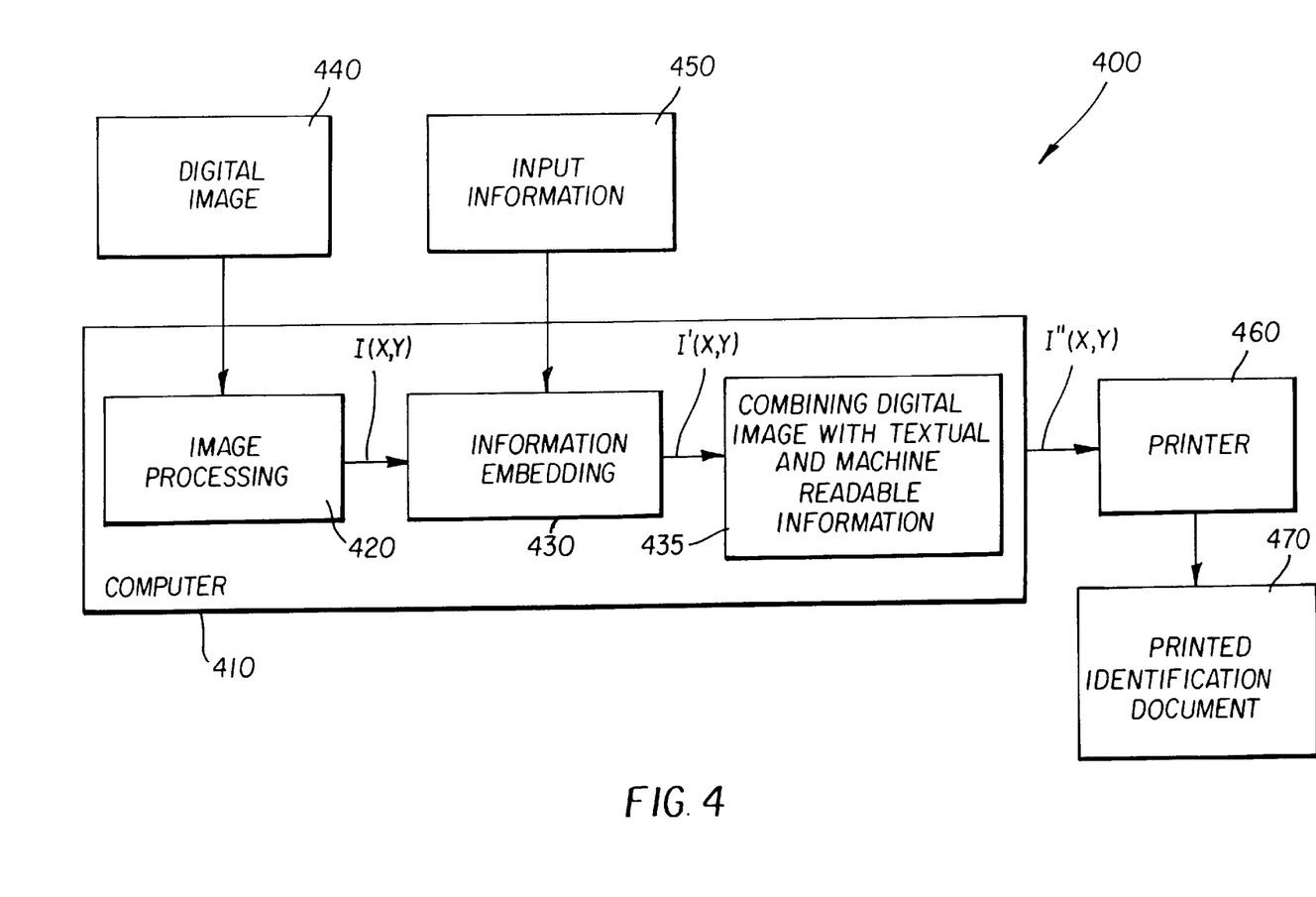
FIG. 4 illustrates an apparatus shown in block-diagram form for making an identification document for a subject in accordance with the present invention.

FIG. 4 illustrates an apparatus for making identification document 400 in accordance with the present invention. The apparatus for making identification document 400 includes a computer 410 that can perform at least the computational operations of image processing 420, information embedding 430, and combining digital image with textual and machine readable information 435.

A digital image 440 is input to the computer 410. The digital image usually includes the face image 50 of the intended holder (or subject) of the identification document 10. The face image 50 is in an identifiable first area. The face image 50 can be obtained by capturing the face of the subject by a digital camera, or by digitizing a hardcopy of the subject's face image using a scanner. The digital image 440 can also contain image objects other than the face image 50 of the subject, such as the background image 60. The digital image 440 includes a plurality of pixels each having at least one pixel value. The face image 50 needs to be authenticated for matching the identity of the intended subject for the identification document 10 to be produced. The digital image 440 is processed in box 420 which can include image processing operations well known in the art such as resizing, tone and color calibration, halftoning, and so on. A processed digital image I(x,y) is produced by image processing 420.

The information is input to the computer 410 from box 450. The input information 450 can be selected by the authority that issues the identification document 10 or provided by the intended subject of the identification document 10. The input information 450 can also be automatically generated according to the information in the database that stores the personal data of all the subjects of the identification document 10. The input information 450 is embedded into the processed digital image I(x,y) in box 430 by modifying the pixel values in I(x,y) to produce a modified digital image I'(x,y) having embedded information.

The embedded information can include information specific to the subject (holder of the identification document) such as the name, the identification number, the signature of the subject. The embedded information can also be the information related to the use of the identification document such as the name of the conference, the club, that tile identification document is used for. The embedded information can correspond to other information such as visual textual information, which is also on the identification document. The input information 450 can be encrypted before embedding (which can be decrypted by computer software in the subsequent verification process, in box 520 of FIG. 5).

The steps of information embedding is now described. In box 430, the input information 450 is embedded into the processed digital images I(x,y) by modifying a predetermined number of pixel values in the processed digital image I(x,y), thus producing a modified digital image I'(x,y). The information embedding can be determined by at least one printing property of the printer 460.

The input information 450 is used to produce a message image M(x,y). The message image M(x,y) can include alphanumeric or graphic information associated with the input information 450. A carrier image C(x,y) is also generated with a uniform or flat Fourier amplitude spectrum and a phase spectrum generated using a random number generator for each phase component. The random phase is required to distribute the message image to make the message invisible and unreadable to human eyes.

The message image M(x,y) and the carrier image C(x,y) are then convolved to form a scrambled signal S(x,y).

$$S(x,y)=M(x,y)*C(x,y) \tag{1}$$

In eqn. (1), the symbol "*" denotes the mathematical operation of convolution, for example, a circular convolution.

The scrambled signal S(x,y) is next added to the digital image I(x,y) to produce a modified digital image I'(x,y) carrying the embedded information:

$$I'(x,y)=I(x,y)+\alpha S(x,y) \tag{2}$$

he scrambled signal S(x,y) is scaled by a scale factor a to maximize the signal of the embedded information while ensuring the invisibility of the scrambled message in the modified digital image I'(x,y). That is, the value of a can also be chosen for optimizing image quality.

The reliability of extracting the embedded information can be improved by superimposing a plurality of blocks of scrambled signals S(x,y) to each color plane of the processed digital image I(x,y). Each of the blocks can be, for example, 64×64, 128×128, or 256×256 pixels in size. For a 300 dpi or 600 dpi printer, these blocks represent a small area (smaller than 1 square inch) on the printed identification document 470. The redundancy in the scrambled signals S(x,y) increases the signal-to-noise ratio in the extraction of embedded information from the printed identification document 470. The redundancy of the scrambled signals also ensures that the embedded information can be extracted from just a small portion of the identification document 470, which is important for the embodiments shown in FIGS. 7 and 8 of this disclosure. In the present invention, the term extracting is used to refer the action of retrieving information from an image or visual textual information.

Details of embedding information in digital images is disclosed in the commonly-assigned above-referenced U.S. patent application Ser. No. 09/218,614, entitled "Method and Apparatus for Transaction Card Security Utilizing Embedded Image Data" and U.S. patent application Ser. No. 09/405,590, entitled "Embedding Information in a Printing Image", the disclosures of which are incorporated herein. The embedding parameters such as the redundancy and amplitude can be optimized by the printing parameters of the printer 460, as disclosed in the above references. As disclosed below in FIGS. 7 and 8 of the present invention, the input information 450 can be uniformly embedded in to the whole area in the visual image 20, or limited only to a selected area such as the face image 50.

The modified digital image I'(x,y) having the embedded information is then combined with other information such as visual textual information 30 and machine readable information 40 in box 435 to produce a combined digital image I''(x,y) having embedded information in a particular identifiable first area which is advantageously in the face of the image of the subject. Electronic signals corresponding to the combined digital image I''(x,y) are sent by the computer 410 to the printer 460 that in turn produces printed identification document 470. The printer 460 can include an ink jet printer, a thermal resistive printer, or a laser (electrophotographic) printer.

Figure 5:
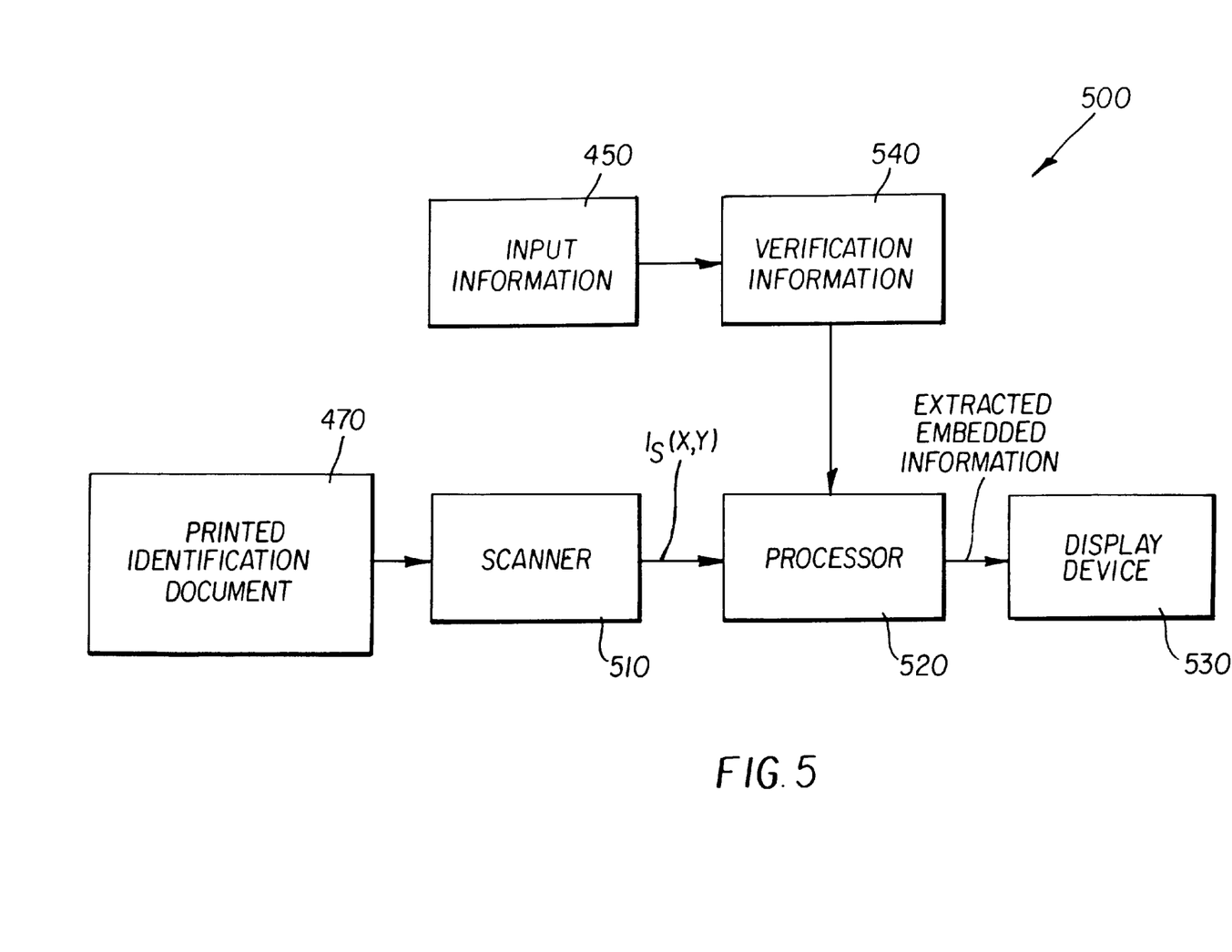
FIG. 5 illustrates a verification apparatus shown in block-diagram form for verifying an identification document in accordance with the present invention.

FIG. 5 illustrates a verification apparatus 500 for verifying validity of an identification document 10 in accordance with the present invention. The verification apparatus 500 includes a scanner 510, a processor 520, and a display device 530. The scanner digitizes the visual image 20 from the printed identification document 470 to produce a scanned digital image $I_s(x,y)$. The scanner 510 can be a hand-held portable device, a flatbed scanner, a digital camera, or a video camera. The processor 520 detects the embedded information from the visual image 20. As disclosed below in different embodiments of the present invention, the detection and the extraction of the embedded information can be uniformly applied to the whole area in the visual image 20, or limited only to a selected area such as the face image 50. The processor 520 also extracts embedded information as described below or disclosed in the commonly-assigned above-referenced U.S. patent application Ser. No. 09/218, 614, entitled "Method and Apparatus for Transaction Card Security Utilizing Embedded Image Data" and U.S. patent application Ser. No. 09/405,590, entitled "Embedding Information in a Printing Image", the disclosures of which are incorporated herein. The extracted information is then displayed on the display device 530 for verifying the correspondence of the extracted information with the input information 450. The input information 450 and other information about the subject or the use of the identification document 10 can be input in a prior recorded database containing verification 540 to be used for verification purpose.

A loophole exists for counterfeiting if the input information 450 is uniformly embedded throughout the visual image 20. The embedded information will still be detected over the counterfeit visual image 320 if there is no discrimination in the detection of such information in the counterfeit visual image 320. In the counterfeiting approach illustrated in FIG. 3 and described in the background of this application, the counterfeiter replaces the face image 50 of the intended subject by the counterfeit face image 350 of a false identity while keeping the background image 360 the same as the original background image 60. The counterfeit face image 350 does not carry any embedded information. Although the embedded information no longer exists in the counterfeit face image 350, the embedded information still exists in the background image 360. The embedded information can still be detected and extracted from the digitized counterfeit visual image 320 digitized from a printed identification document 470. This can create a mistaken authorization of the counterfeit identification document 310.

The present invention effectively prevents the above described counterfeiting approach. These anti-counterfeiting disclosures will be discussed below in relation to FIGS. 6 through 8 and in conjunction with the apparatus for making identification document 400 and verification apparatus 500.

Figure 6:
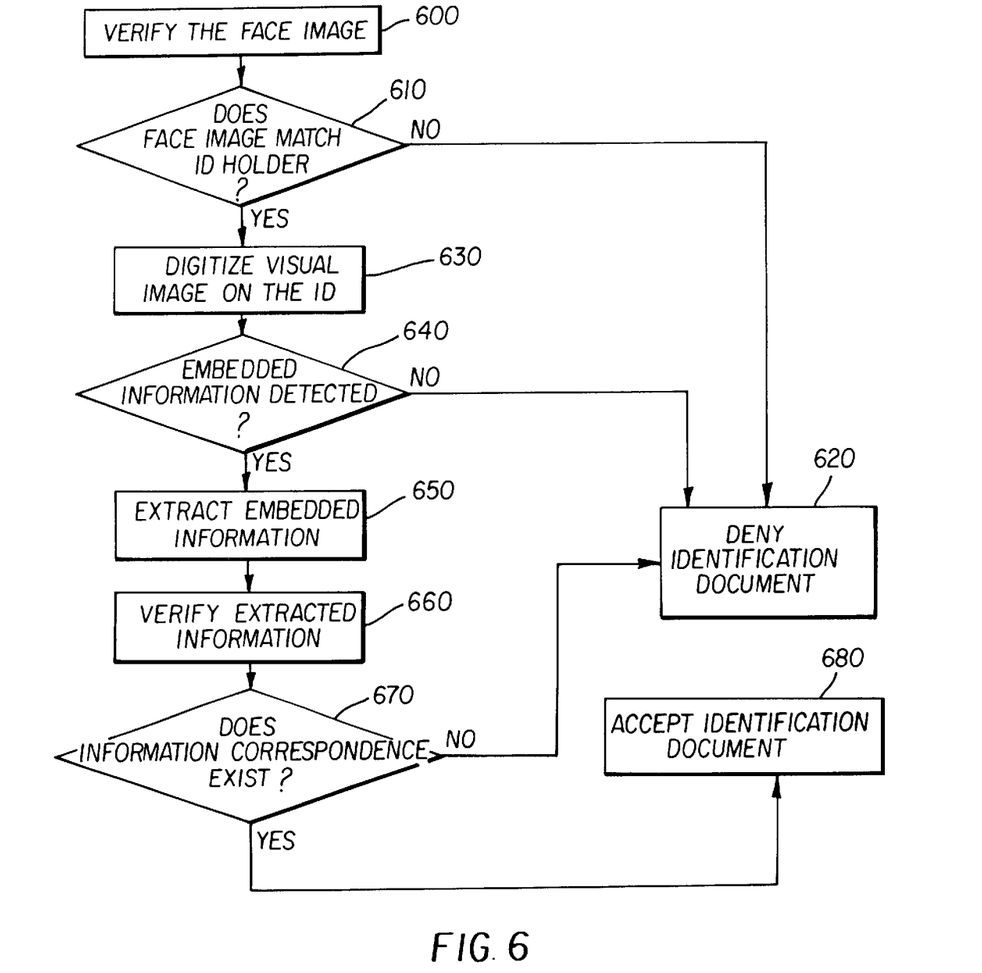
FIG. 6 illustrates a flow diagram of the operations of the FIG. 5 apparatus for verifying the identity of the subject in the identification document.

FIG. 6 illustrates a flow diagram of the operations for verifying the identity of the subject in accordance with the present invention. The verification apparatus 500 is installed at a checkpoint, for example, an entrance point to a conference that the identification document 10 is used for. When a holder holding an identification document 10 passes the checkpoint, his or her identity needs to be verified, that is, the validity or authenticity of his or her identification document 10 is verified. The holder presents identification document 10 to security personnel. The security personnel first verifies in box 600 that the holder's face matches the face image 50 in the visual image 20 of the security document 10.

In FIG. 6, a question in box 610 is asked whether the holder's face matches with the face image. If they do not match, the identification document 10 is denied in box 620, as in a typical security checking procedure. Proper security measures may also be applied. If the answer is yes to the question in box 610, the verification procedure proceeds to box 630 wherein the security personnel scans the visual image 20 on the identification document 10 using the scanner 510. A scanned digital image $I_s(x,y)$ is therefore produced.

The scanned digital image $I_s(x,y)$ is then sent to the processor 520 wherein a program first detects the existence of the embedded information in box 640. If no embedded information exists in the face image 50, the identification document 10 is denied as previously in box 620. The arrangement of detecting the embedded information in box 640 may vary depending on the different embodiments in accordance with the present invention.

Figure 7:
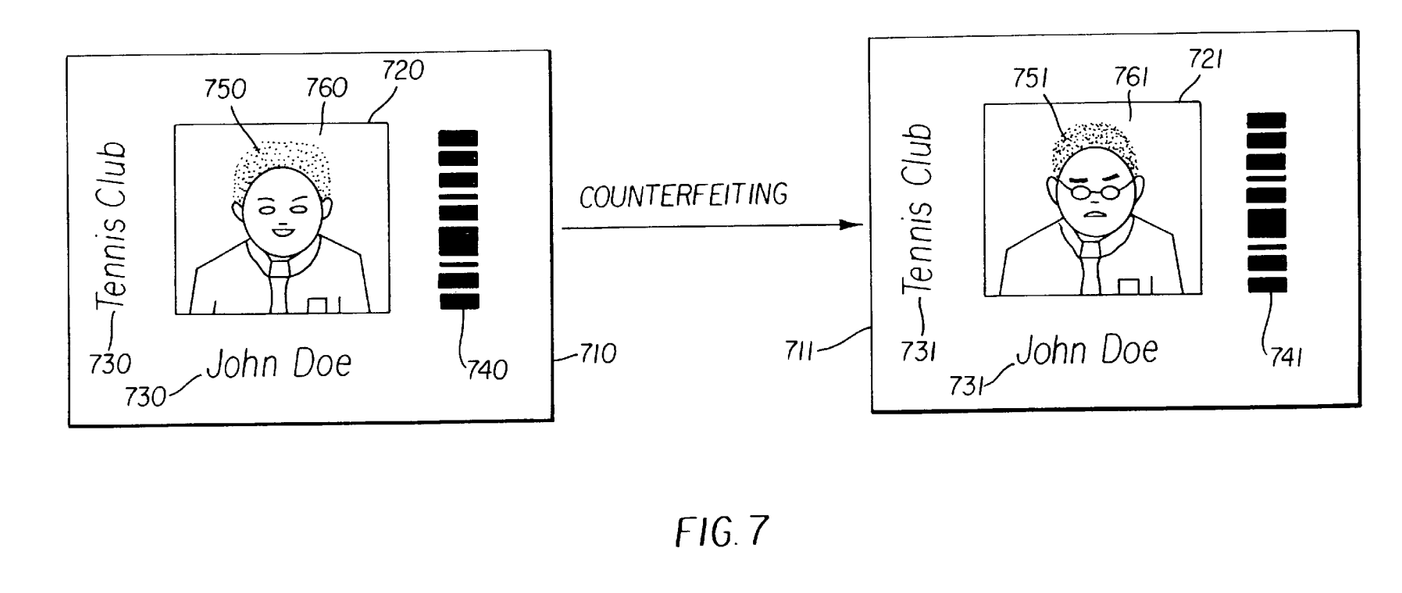
FIG. 7 shows one embodiment of the present invention wherein the embedded information is detected and extracted only from the face image of the visual image in the, verification process.

In one embodiment illustrated in FIG. 7, the input information 450 is embedded throughout the visual image 720 with embedded information. Both the face image 750 and background image 760 can have information embedded in them. To thwart the counterfeiting technique as described previously, the processor 520 first identifies the face image 750 with embedded information in the first area of the visual image 720 with embedded information. In the present invention, the area for the face image 750 can be identified by for example, the locating the borders of the face area or the Chroma Key method, which are known in the art. The Chroma Key method is disclosed for example in U.S. Pat. No. 5,249,039 and references therein. The detection and the extraction of the embedded information are only conducted in an area within the face image 750.

The prevention of counterfeiting in FIG. 7 is now described. The counterfeit identification document 711 includes a counterfeit visual image 721, visual textual information 731, and machine readable information 741. The counterfeit visual image 721 includes a counterfeit face image 751 without embedded information and a background image 761 with embedded information. If the counterfeiter has replaced the face image 750 by the counterfeit face image 751, the embedded input information 450 no longer exists in the counterfeit face image 751 without embedded information. No embedded information will be detected within the counterfeit face image 751 in box 640. This will result in a denial of the counterfeit identification document 711 in box 620.

Figure 8:
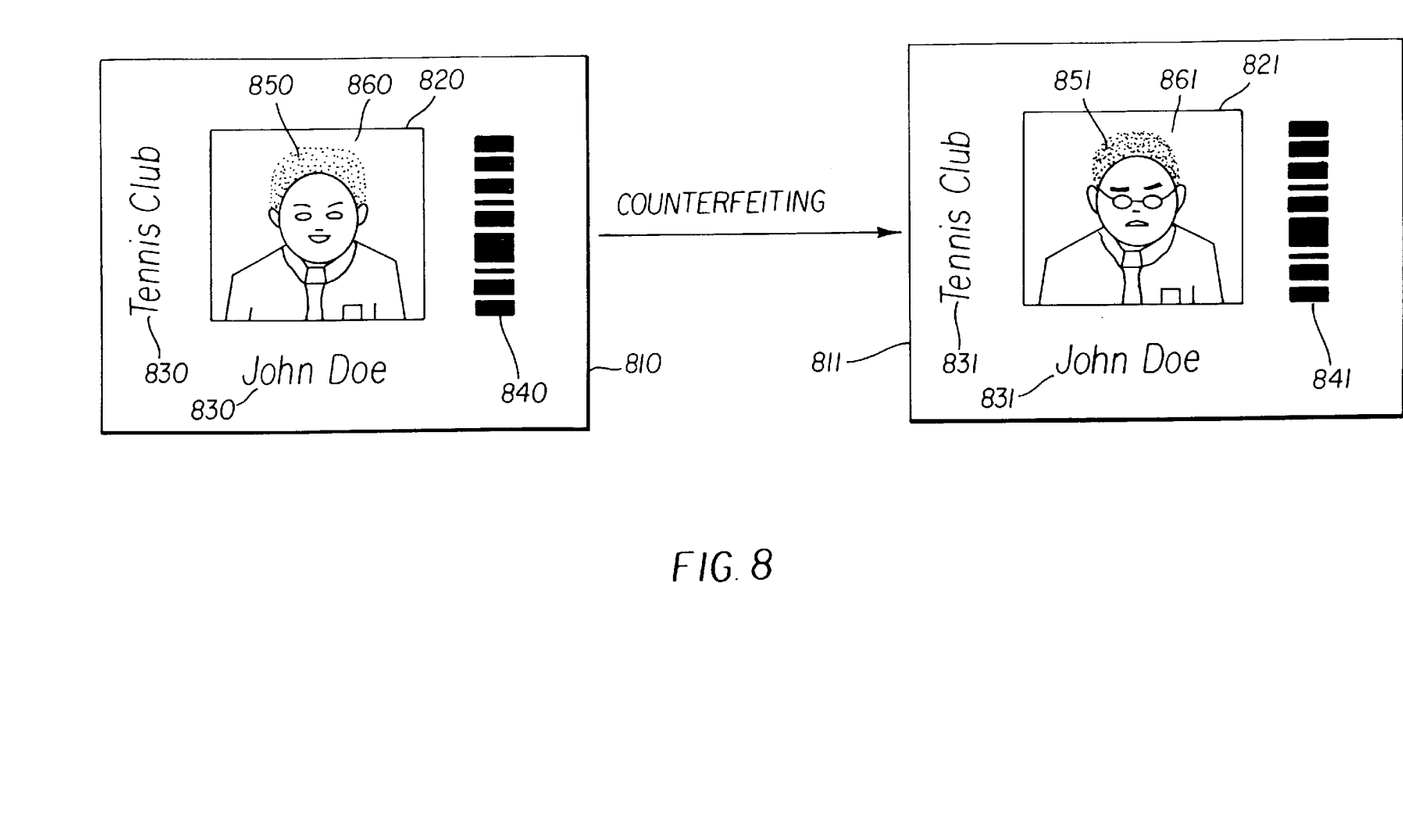
FIG. 8 shows another embodiment of the present invention wherein the information is embedded only in the face image but not in other area of the visual image of an identification document.

FIG. 8 shows the arrangement of another embodiment in accordance with the present invention. The apparatus for making identification document 400 produces an identification document 810 having a visual image 820, visual textual information 830, and machine readable information 840. The visual image 820 includes a face image 850 with embedded information corresponding to the subject of the identification document 810, and a background image 860 without embedded information. In box 430 (of FIG. 4), a program first searches and defines the face image 850. The information is then embedded only in the face image 850 in the visual image 820.

In the counterfeit identification document 811, the counterfeiter replaces the face image 850 with embedded information by a counterfeit face image 851 without embedded information. The counterfeit identification document 811 then includes a counterfeit visual image 821, visual textual information 831, and machine readable information 841. The counterfeit visual image 821 includes a counterfeit face image 851 and a background image 861. Since the original face image 850 was replaced, neither the counterfeit face image 851 or the background image 861 has embedded information in it. No invisible information that was originally embedded in FIG. 4 exists in any part of the counterfeit visual image 821. In box 640, no embedded information is detectable from anywhere in the counterfeit visual image 821. The counterfeit identification document 811 will subsequently be denied in box 620 (of FIG. 6).

Referring again to FIG. 6, if embedded information is detected in box 640, the embedded information is extracted in box 650. Details of detecting and extracting embedded information are disclosed in the commonly-assigned above-referenced U.S. patent application Ser. No. 09/218,614, entitled "Method and Apparatus for Transaction Card Security Utilizing Embedded Image Data" and U.S. patent application Ser. No. 09/405,590, entitled "Embedding Information in a Printing Image", the disclosures of which are incorporated herein.

In box 660, the extracted embedded information is compared with the textual and machine readable information on the identification document. The extracted embedded information is also compared with the verification information associated with particular subject. The comparison can be done visually on a display device 530 or automatically by the processor 520.

If in box 670 correct correspondence is not found in either of the two comparisons, the identification document is denied in box 620. Also in box 670, if the correspondence is found in both comparisons, the identification document is accepted and a pass is permitted to the holder of the identification document in box 680.

The invention has been described in detail with particular reference to certain preferred embodiments thereof, but it will be understood that variations and modifications can be effected within the spirit and scope of the invention.

PARTS LIST 10 identification document
20 visual image
30 visual textual information
40 machine readable information
50 face image
60 background image
200 image receiving layer
201 image receiving layer
210 protection layer
211 protection layer
220 substrate
310 counterfeit identification document
320 counterfeit visual image
330 visual textual information
340 machine readable information
350 counterfeit face image
360 background image
400 apparatus for making identification document
410 computer
420 image processing
430 information embedding
435 combining digital image with textual and machine readable information
440 digital image
450 input information
460 printer
470 printed identification document
500 verification apparatus
510 scanner
520 processor
530 display device
540 verification information
600 verify the face image
610 does face image match the ID (identification document) holder?
620 deny identification document
630 digitize the visual image on the ID (identification document)
640 embedded information detected?
650 extract embedded information
660 verify extracted information
670 does information correspondent exist?
680 accept identification document
710 identification document
711 counterfeit identification document
720 visual image
721 counterfeit visual image
730 visual textual information
731 visual textual information
740 machine readable information 741 machine readable information
750 face image
751 counterfeit face image
760 background image
761 background image
810 identification document
811 counterfeit identification document
820 visual image
821 counterfeit visual image
830 visual textual information
831 visual textual information
840 machine readable information
841 machine readable information
850 face image
851 counterfeit face image
860 background image
861 background image

What is claimed is:

1. An identification document for a subject, comprising:
   a) a substrate;
   b) a visual image formed on the substrate or a recording layer over the substrate, such visual image including at least a face image of the subject in a first area; and
   c) invisible but retrievable embedded information formed in the face image in the first area but not formed in a second area of the visual image, such embedded information corresponding to the identity of the subject and being usable for identifying the subject.

2. An identification document for a subject, comprising:
   a) a substrate;
   b) a visual image formed on the substrate or a recording layer over the substrate, such visual image including at least a face image of the subject in a first area;
   c) invisible but retrievable embedded information formed in the face image in the first area but not formed in a second area of the visual image, such embedded information corresponding to the identity of the subject; and
   d) visual textual information in the second area for identifying the subject wherein such textual information corresponds to the identification information in the embedded information such that the correspondence of the two information can be used for verification purposes.

* * * * *